July 20, 1965 A. E. BRENNEMANN ETAL 3,196,408
SUPERCONDUCTIVE STORAGE CIRCUITS
Filed May 24, 1961 3 Sheets-Sheet 1

INVENTORS
ANDREW E. BRENNEMANN
NORMAN H. MEYERS

BY John E. Dougherty, Jr.
ATTORNEY

SUPERCONDUCTIVE STORAGE CIRCUITS

Filed May 24, 1961 3 Sheets-Sheet 3

3,196,408
Patented July 20, 1965

3,196,408

SUPERCONDUCTIVE STORAGE CIRCUITS

Andrew E. Brennemann and Norman H. Meyers, Poughkeepsie, N.Y., assignors to International Business Machines Corporation, New York, N.Y., a corporation of New York Filed May 24, 1961, Ser. No. 112,373
3 Claims. (Cl. 340—173.1)

The present invention relates to superconductive circuits and, more particularly, to improved thin film superconductive storage circuits.

It is, of course, now well known that devices formed of closed loops of superconductive material maintained at a temperature at which the material is in the superconducting state are capable of having stored therein currents which persist indefinitely without the application of electrical energy. These devices depend for their operation upon the characteristic of the superconducting state in accordance with which it is not possible, neglecting penetration effects, to change the net flux threading a superconducting loop without introducing resistance into the loop. The superconducting loop in which the current is stored may be formed of two parallel superconducting paths or may be part of a continuous sheet of superconducting material. A persistent current may be stored in a loop formed by two parallel paths by applying a current to the parallel paths, introducing resistance into a superconducting gate in one path to cause the applied current to flow in the other path, allowing the gate to become superconducting, and then removing the applied current. A persistent current may be stored in a parallel path loop or a continuous sheet loop by applying a magnetic field which both drives a portion of the loop resistive and provides a flux which threads the loop, and then removing the applied field in such a way that there is a net flux threading the loop at the time it becomes entirely superconducting. More detailed explanations of the structure and mode of operation of persistent current storage devices of the prior art are found in the following articles: "Trapped Flux Superconducting Memory," by J. W. Crowe, IBM Journal of Research and Development, vol. 1, No. 4, October 1957, pp. 294–303; "An Analysis of the Operation of a Persistent-Supercurrent Memory Cell," by R. L. Garwin, IBM Journal of Research and Development, vol. 1, No. 4, October 1957, pp. 304–308; "Continuous Sheet Superconductive Memory," by L. L. Burns et al. Office of Naval Research Symposium Report ACR–50, pp. 167–185; "Thin Film Catalog Memory," by A. E. Slade et al., Office of Naval Research Symposium Report ACR–50, pp. 213–229.

Further pertinent art on the construction of low inductance thin film circuits is found in copending application Serial No. 824,120, now Patent No. 3,059,196, filed June 30, 1959, on behalf of John J. Lentz, and in Patent No. 2,966,647, issued on December 27, 1960.

The development of storage devices of this type has been carried on with particular emphasis on the applications of the devices in large scale high speed data handling equipment. Therefore, there has been a continuing effort to develop persistent current storage devices which may be switched at very high speeds, which are extremely small, which dissipate little heat in switching, which can be employed in two and three dimensional memories without too stringent requirements on the size and type of addressing pulses required, and which have reproducible characteristics and can be mass produced on a large scale with a high yield of usable devices. Many of these characteristics have been realized by constructing the superconductive devices in the form of thin films having widths much greater than thicknesses, and placing the devices and circuitry on superconducting shields. Devices of this type can be mass produced using printed circuit type techniques; they provide relatively high resistance and low inductance and can be operated at high speeds. However, in all of the devices of the prior art, the persistent current is stored in a loop formed either by a continuous sheet or two conductors arranged side by side so that the axis around which the persistent current flows is perpendicular to the width of the thin films and also to the shield on which these films are deposited. With this type of construction the reduction in inductance that can be achieved is limited. The speed of such devices can be increased by making the films very thin so that they exhibit a high resistance when driven from the superconducting to normal state. However, extremely thin films exhibit higher inductance, require a more intense applied magnetic field to drive them resistive, have lower self-current characteristics which are difficult to reproduce from film to film, and increase the problems due to heating. Further, most such high speed devices of the prior art demand very precise and/or complex drive pulse patterns when operated in a memory array.

In accordance with the principles of the subject invention, improved superconductor devices and circuits are provided which are particularly suitable for use in persistent current memory applications. In one embodiment of the invention herein disclosed, by way of illustrating the inventive principle, a parallel path superconducting loop is fabricated of two planar strips arranged one above the other on top of a superconducting shield. The two conductors are preferably arranged in as nearly exact registration as possible so that one forms a mirror image of the other and are separated by an extremely thin layer of insulating material. With this type of construction, the loop has a very low inductance. As a result of the low inductance of the device, it is possible to operate it at extremely high speeds with relatively low resistance gates. The gates, as well as the remaining portions of the loop therefore, may be relatively thick compared to the penetration depth of the superconductive material of which they are fabricated. Since this increase in speed of operation is achieved primarily by lowering inductance, the energy dissipation is small and heating problems are minimized. Since the gate section of the loop is relatively thick compared to its penetration depth, it exhibits a relatively high critical current, and may be driven resistive by a relatively small applied magnetic field. Further, the drive conductors for the loop may be arranged parallel to the gate to form, with the gates, in-line cryotrons which exhibit improved critical gate current characteristics and provide relatively high resistances even though the gate has a thickness much greater than its penetration depth. This embodiment of the improved storage device is operated in response to signals applied to a control conductor or conductors, which provide magnetic fields that both drive the gate section of the loop resistive and thread the loop so that upon termination of the drive signals a persistent current is induced in the loop. The coupling between the drive lines and the loop is controlled so that the magnitude of the stored persistent current is significantly less than the critical gate current. The direction of the induced persistent current depends upon the direction of the applied signals. The persistent current state of the loop may be interrogated in response to signals applied to the same control conductors by sensing the voltage produced when persistent current stored in the loop is quenched. The loop may be also interrogated non-destructively in response to signals applied to the same control conductors by a superconducting gate which is responsive to the fields produced by current in the loop. Other embodiments of the invention herein disclosed illustrate that the entire loop may be formed of a superconducting material, or a portion or portions only of the loops may be fabricated of soft superconductive material and the remainder of the loop of a hard superconductive material. Where a superconducting gate is employed to achieve non-destructive readout, the gate may be of the same superconducting material as the gate in the loop, or may be fabricated of another softer material which requires a smaller applied magnetic field to drive it resistive. Further, the storage loop may be formed of a single conductor laid down on a superconducting shield with the shield itself forming the return path for the loop.

Therefore, it is an object of the present invention to provide an improved superconducting storage device.

A further object is to provide a low energy, high speed superconducting device.

A further object is to provide an improved superconductive memory array.

Still another object is to provide a superconductive storage device which is extremely small, and which can be economically mass produced in large numbers.

A further object is to provide an improved superconductive storage device which can be fabricated on a mass scale with reproducible characteristics.

A more specific object is to provide a superconductive storage loop with extremely small inductance.

Another object is to provide a superconducting storage device fabricated of superconductive films having thickness dimensions greater than their penetrating depth which is operable at extremely high speeds.

Still another object is to provide an improved superconductive storage device which can be addressed for both writing and interrogation using the same address lines, and more specifically such a device where the interrogation is non-destructive.

Another object is to provide an improved persistent superconductive storage device driven by an in-line cryotron, in which the pulse applied to the controls of the cryotron serve the purposes of inducing a current in the loop, driving the gate resistive and providing flux to be trapped within the loop.

A further object is to provide a persistent current storage device of the type which is not sharply dependent on the basic critical current characteristics of the superconducting films forming the loop.

More specifically, it is an object of the present invention to provide an inductively driven persistent current storage device in which the switching of the superconductive material in the loop is controlled primarily by applied fields rather than by loop current.

The foregoing and other objects, features and advantages of the invention will be apparent from the following more particular descritpion of preferred embodiments of the invention, as illustrated in the accompanying drawings.

Though the first embodiment illustrating the principles of the present invention which will be described in detail is the embodiment of FIG 3; it is considered wise to first explain in some detail the characteristics of an in-line cryotron, since cryotrons of this type and their characteristics are used to advantage in each of the embodiments of the invention specifically disclosed herein.

Figure 1:
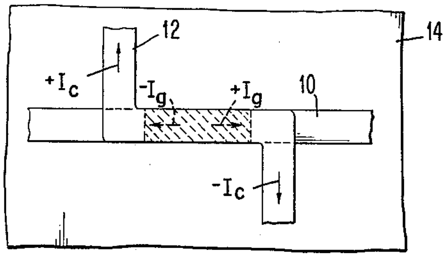
FIG. 1 is a representation of an in-line cryotron.
Figure 1A:
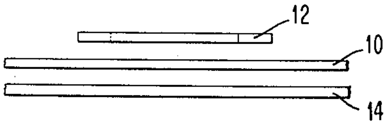
FIG. 1A is a side view of the in-line cryotron of FIG. 1.

FIG. 1 is a schematic representation of an in-line cryotron which includes a gate conductor 10 and a control conductor 12 both of which are laid down on a superconductive shield 14. The gate conductor 10 is separated from the shield 14 by a layer of insulating material and likewise the control conductor 12 is separated from the gate conductor 10 by a layer of superconductive material. In order to avoid over complicating the drawings, the layers of insulating material are not shown. However, wherever possible, such as in, for example, the side view of FIG. 1A, the insulation is illustrated by a space between the various conductors.

Both the control conductor 12 and the gate conductor 10 are formed of thin films of superconductive material with the width of each conductor being appreciably greater than its thickness. The thickness dimensions of the conductors are somewhat exaggerated in the side view of FIG. 1A for purposes of illustration, actual thicknesses being usually in the order of 10,000 angstroms or less and are greater than the penetration depth for the conductors at the operating temperature. As can be seen in the figures, the control conductor 12 is of the same width as the gate conductor 10 and includes a portion arranged above and parallel to the gate conductor. The control conductor 12 is of the same width as the gate conductor 10 and includes a portion arranged above and parallel to the gate conductor. The control conductor is preferably fabricated of hard superconductive material such as lead and the gate conductor of a soft superconductive material such as tin. Only that portion of the gate conductor which lies beneath the straight line portion of the control conductor is fabricated of soft superconductive material. In operation, the temperature of the cryotron is such that both the gate conductor and the control conductor are superconducting in the absence of a magnetic field. By applying current to the control conductor, the gate conductor is selectively driven from the superconducting to the resistive state.

Figure 2:
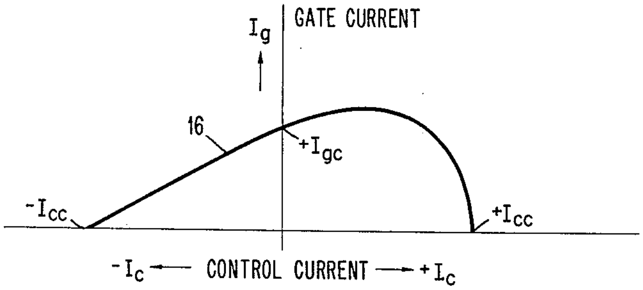
FIG. 2 is a plot of the static current gain characteristic of the in-line cryotron shown in FIG. 1.

The operating characteristics of the in-line cryotron of FIG. 1 are illustrated by the plot of FIG. 2. The curve 16 defines the state of the gate conductor 10, superconducting or normal, for various combinations of control current $I_c$ and $I_g$. When particular values of applied control current and gate current define a point inside this curve, the gate conductor is in a superconductnig state. When the applied currents define a point outside the curve, the gate conductor is in a normal or resistive state. The control conductor current $I_c$ is plotted along the abscissa and the gate conductor current along the ordinate. The plus and minus designations indicate direction of current as shown in FIG. 1. Thus it can be seen that where the control conductor and the gate conductor currents are flowing in opposite directions, the operation of the device as illustrated by the right-hand portion of the curve 16 is different than when the control gate conductor currents are flowing in the same direction.

In the plot of FIG. 2, the point $+I_{gc}$ represents the value of gate conductor current which is sufficient, of and by itself, in the absence of any current in the control conductor to drive the gate conductor resistive. This value of current is termed the basic critical self-current for the gate conductor. The values $+I_{cc}$ and $-I_{cc}$ indicate the magnitude of current required in the control conductor to produce a magnetic field sufficient to drive the gate conductor resistive in the absence of any current in the gate conductor. This value is termed the critical control conductor current and is the same regardless of direction. From the curve it is obvious that the value of control conductor current required to drive the gate conductor resistive decreases as gate current is applied. Thus, the maximum current which can be carried by the control conductor with the gate remaining superconducting is just below the value $I_{cc}$ and this is so regardless of the relative direction of current flow in the control and gate conductors. However, for any given value of the gate conductor current the state of the gate conductor may vary in the presence of control conductor current according to whether the control conductor current and gate conductor current flow in the same direction or in opposite directions. For example, though the critical self-current which the gate conductor can carry in the absence of control conductor current is $I_{gc}$, this critical self-current of the gate conductor is increased by the application, within limits, of control conductor current in the opposite direction. However, the application of control conductor current in the same direction as the gate conductor current reduces the value of current which the gate conductor may carry and still remain in the superconducting state.

In the usual operation of in-line cryotrons in cryogenic circuits, the control and gate conductor currents are applied in opposite directions, and the operating characteristics are represented by that portion of the curve 16 which is to the right of the ordinate of FIG. 2. It is also usual in the operation of such a device to replace a single control conductor such as that represented at 12 in FIG. 1 by two or more control conductors arranged one on top of the other. These individual controls are all of equal width and aligned directly above the gate. Individual pulses may be applied to the various control conductors, or one may be utilized as a bias control and the other(s) as the conductor(s) to which control signals are applied. In multiple control structures of this type the width of each of the conductors is appreciably greater than its thickness and also appreciably greater than the distance between the conductors , and the operating characteristics are as indicated in FIG. 2 with the abscissa representing not the single current applied to a single control conductor, but the net current applied to the multiple control conductors.

Figure 3:
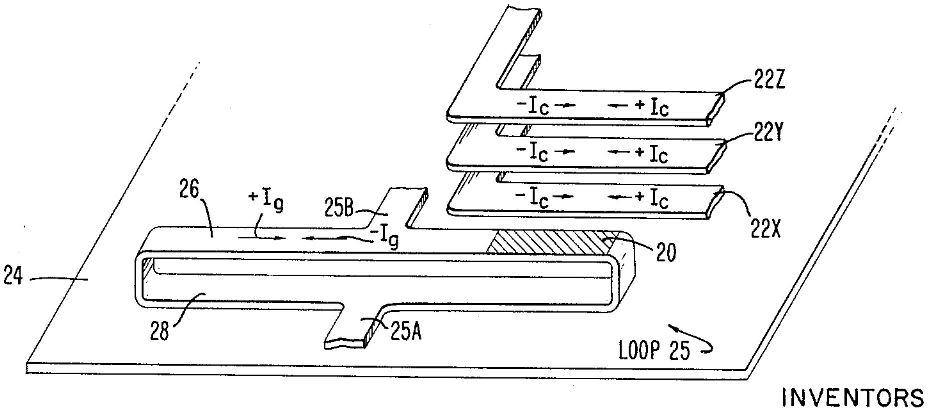
FIG. 3 shows the structure of one embodiment of a superconductive storage device constructed in accordance with the principles of the present invention.

Referring now to FIG. 3 which shows a persistent current storage device and the drive conductors for the storage device, it can be seen that a multiple control in-line cryotron is formed by a gate conductor section 20 and three control conductors 22X, 22Y, and 22Z. The gate conductor section 20 is part of a superconductive loop 25 formed by two planar conductors 26 and 28 which are laid down one above the other on a superconductive shield 24. The lower conductor 28 of loop 25 is separated from the shield 24 by a layer of insulating material and, similarly, each of the successively formed conductors 26, 22X, 22Y and 22Z is separated from the adjacent conductor by a layer of insulating material. These layers of insulating material are not shown; rather the conductors are shown spaced one from the other with the spacing between the conductors being greatly exaggerated in order to provide a clearer showing of the actual construction. The thickness of the layer of insulating material separating the two paths 26 and 28, which form loop 25, is actually in the order of a few thousand angstroms, or less. Since the spacing between these two conductors is so small and the conductors are laid down one above the other, the loop 25 exhibits relatively low inductance. The overall inductance of the loop when in operation is determined by the difference between the inductance of the individual paths relative to their return currents in the shield and the mutual inductance between the paths, and is, therefore, extremely small. It should be further noted that since the loop is formed by the two strips 26 and 28 laid down one above the other, the loop formed by the cell takes up only a small portion of the area of the shield 24.

Figure 4:
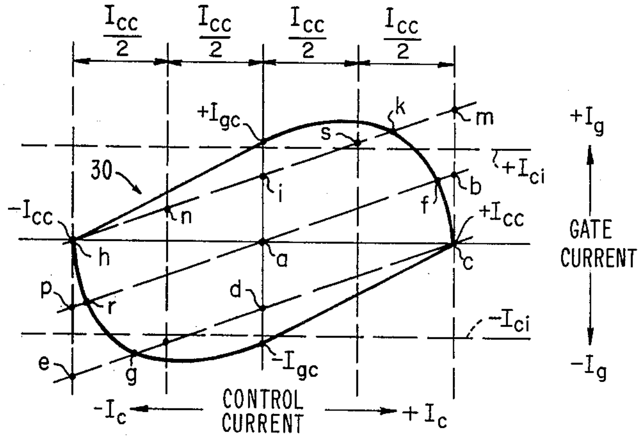
FIG. 4 is a plot of the operating characteristics of the storage device of FIG. 3.

The operating characteristics of the storage device of FIG. 3 are illustrated in the plot of FIG. 4. The upper portion of the closed loop curve 30 is an exact replica of the in-line cryotron characteristic curve 16 in FIG. 2, and the lower portion is an inverted image of this characteristic. The portions of this curve in the first and third quadrants are exactly the same and represent the characteristic for gate and control currents in either both positive or both negative as indicated in FIG. 1; the portions of the curve in the second and fourth quadrants are exactly the same and represent the characteristic for control and gate currents, one positive and one negative as defined in FIG. 1. In the plot of FIG. 4, the abscissa represents the net current applied to the three control conductors 22X, 22Y, and 22Z of FIG. 3. Control conductor current to the right in FIG. 3 is represented as minus and to the left as plus. The current plotted along the ordinate of FIG. 4 is representative of the current in the gate section 20. Since, in the operation to be described, this gate forms part of the loop 25, the gate current as plotted is also representative of the current in the loop 25 with current flow in the clockwise direction being plotted as plus current and current in the counter clockwise direction being plotted as minus current.

The storage device of FIG. 3 is operated by applying current to the control conductors 22X, 22Y and 22Z to selectively produce a magnetic field sufficient to drive the gate conductor section 20 of loop 25 from a superconducting to a normal state, the other portions of the loop remaining superconductive. When the applied field is removed by terminating the signals applied to the control conductors, the gate conductor 20 becomes superconducting at a time when there is still a net field linking loop 25. Therefore, as the magnetic field from the control conductors is reduced to zero, an induced persistent current is established in the loop 25. The direction of the persistent current is determined by the direction of the magnetic field applied as the result of the application of the signals to the control conductors.

The magnitude of the current which is induced in the loop 25 by the control conductors 22X, 22Y and 22Z is determined by the actual coupling between the control conductors and the loop. It is preferable in the operation of the storage device that the magnitude of the induced persistent current in the loop 20 be less than the critical self-current $I_{gc}$ for the gate conductor. For this reason the control conductors 22X, 22Y and 22Z are arranged above only a portion of the path 26 and there is inductive coupling between the loop and the control conductors only along this portion of the path.

Referring to the operating diagram of FIG. 4 the amount of coupling between the control conductors and the loop determines the slope of the three operating lines there shown. One such operating line is the line *prafb* which passes through the origin of the plot. The point *a* represents the condition with no current flowing in the loop and no current in any of the control conductors. When, however, a positive current is supplied to the control conductors, that is a current to the left in FIG. 3, but to the right in FIG. 4, a positive current is initially induced in the loop 20, which current flows to the right in the upper path 26 through gate conductor 20. As the applied field is increased, the amount of induced current is also increased until a point is reached at which the transition curve is crossed and the gate is driven resistive. When the gate becomes resistive, the current in the loop is quickly reduced to zero. Where the rise time of the input signals applied to the control conductors is fast compared to the time constant of loop 25, this operation is represented most nearly by the lines *km* and *mbc*. Where, however, as is the usual case with the high speed loop of this invention, the rise time of the applied signal is slow compared to the time constant of the loop, this operation by which the loop current is reduced to zero is represented by the curved section *kfc* of curve 30.

Point *c* represents the condition with zero current in the loop 25 and the signals maintained on the control conductors sufficient to drive the gate 20 resistive. Particular note should be made of the fact that the gate is driven resistive essentially by the applied field from the control conductors and is maintained resistive by this field in the absence of current in the gate conductor itself. Therefore, the switching operation is not critically dependent upon the self-current of the gate conductor. When the applied field is removed, the operation is depicted along the dotted line *cd* in FIG. 4. The gate conductor 20 becomes superconducting almost immediately so that as the field is removed a current is induced in the loop 25. As mentioned above, the slope of the operating line *cd* and the amount of persistent current induced in the loop is determined by the coupling between the controls 22X, 22Y and 22Z and loop 25. Upon termination of this operation, it can be seen that there is a persistent current in the negative direction, as represented at point *d* in FIG. 4, circulating in the loop 25.

In the discussion to follow, a negative persistent current, that is a current circulating in a counter clockwise direction in loop 25, as represented at point *d*, represents a binary zero. A binary one may be stored in the loop by energizing one or more of the control conductors to apply sufficient current $I_{cc}$ in the negative direction to cause the gate 20 to become resistive. When such a field is applied, the initial operation is depicted by the line *dg*. The gate 20 becoming resistive due to the applied field at point *g*. The induced current is reduced to zero either along the lines *ge* and *eph* or along the line *grh* according to the relationship between the rise time of the input pulse and the time constant of the loop. When the persistent current originally circulating in the loop is completely quenched, the device is at a state as represented at point *h* in FIG. 4. The gate is held resistive by the applied field and there is no current flowing in the loop. When the applied signals are terminated, gate 20 becomes superconducting at a time at which there is a net flux threading loop 25 so that the operation upon termination of the signals proceeds along the line *hni*. The resulting condition is at point *i* with a persistent current in the positive direction stored in loop 25 representative of a binary one. Again it should be noted that the persistent currents stored at points *i* and *d* are significantly less than the basic critical self-current for the gate 20 as represented at $+I_{gc}$ and $-I_{gc}$.

The control conductors 22X, 22Y and 22Z may be employed to control the device in accordance with multiple selection schemes such as are used in two and three dimensional memory arrays. For example, consider the operation where addressing signals are applied to the control conductors 22X and 22Y and masking and inhibit signals to control conductor 22Z. In such a mode of operation, the magnitude of the signals applied to the X and Y conductors must be at least equal to one half the critical control current as indicated in FIG. 4. This is the minimum magnitude allowable and the operation is explained with reference to signals of this type, though for faster and less critical operation larger half select signals are employed, e.g. signals equal to ⅔ $I_{cc}$. Assume the device is storing a binary one at point *i* in FIG. 4 and one of the control conductors 22X is energized with a current equal to $$\frac{I_{cc}}{2}$$

If the applied current is in the plus direction, the induced current in the loop and the field applied by the control conductors is such as to locate the operating point at *s* and the gate 20 is not driven resistive. When the applied signal is removed, the induced current is also decreased and the device returns to its initial condition at point *i* retaining a stored binary one. Similarly, when a half select signal is applied to one control conductor in the opposite direction, the device undergoes an excursion from the point *i* to the point *n*. Again the gate 20 is not driven resistive and upon termination of the signal the device reverts to the binary one state at point *i*. The importance of storing a persistent current significantly less than the critical current for the gate is illustrated by this operation. The device when storing either a binary one or a binary zero is capable of withstanding a half select pulse in either direction without changing the direction or magnitude of the stored persistent current.

When the device is storing a binary one, as represented at point *i*, it can be switched to a binary zero storage state by coincidently applying signals in the positive direction to the control conductors 22X and 22Y. When such pulses are applied and removed, the operation is depicted along the line *ikcd*. Particular note should be made of the fact that it is not necessary that either the leading or the trailing edges of the applied pulses be exactly simultaneous to achieve this type of operation and further, because of the low inductance of the loop, the operation is not dependent on thermal effects. Similarly when the device is storing a binary zero at point *d*, it may be switched to the binary one state at point *i* by applying current signals in the negative direction to the control conductors 22X and 22Y.

If the switching of the device to the binary one state at *i* is considered a writing operation and switching to the binary zero state at *d* a read operation, the conductor 22X may be used to both inhibit write operations and mask read operations. If, when the device is in the binary zero state at point *d*, negative half select signals are applied to the control conductors 22X and 22Y, a binary one is written in the absence of a signal on control conductor 22Z. However, the write operation is inhibited by applying a half select signal in the positive direction to control conductor 22Z. Similarly if the device is in the binary one state at point *i*, a read operation may be performed by switching it to the binary zero state at point *d* by the application of coincident signals in the positive direction to control conductors 22X and 22Y. However, the read operation may be masked by applying a half select signal in the negative direction to conductor 22Z.

During a read operation a voltage output indicative of whether a binary one or a binary zero is stored in the device is developed between the terminals 25A and 25B of loop 25. Assuming for example, that the loop is storing a binary one at point *i* and coincident signals in the positive direction are applied to control conductors 22X and 22Y, the initial operation is depicted along the operating line *ikm*. At the point *k* this line intersects the operating characteristic of the loop, the gate 20 is driven resistive and the persistent current in the loop is quenched. When the gate is driven resistive, though the lower path 25 remains entirely super-conductive, a large IR drop is produced in the gate to quench the persistent current. This produces a transient voltage of significant magnitude between the terminals 25A and 25B.

When the device is in the binary zero state at point *d* and a read operation is performed by coincidently energizing the control conductors 22X and 22Y in the positive direction, the operation of the device is depicted by the operating line *dc*. The current introduced in the loop as a result of the applied signals reduces the persistent current in the loop to essentially zero so that when the gate becomes resistive at point *c* there is no longer any persistent current in the loop. Therefore, though a noise signal may be produced due to transformer coupling, the voltage output between the terminals 25A and 25B is relatively small. The signal to noise ratio may be improved by fabricating the loop 25 with the portion extending from terminal 24A to terminal 25B which includes gate 20 to have a lower inductance than the other half of the loop. Upon termination of the readout signals regardless of whether a binary one or a binary zero was originally stored, the device returns along the operating line *cd* to the binary zero state at point *d*.

Though in the operation above described, the signals applied by the control conductors 22X and 22Y have been taken to be equal to exactly half $I_{cc}$, in actual operation, the applied signals are somewhat larger in order to render the operation of the device less critical. However, in all cases, the half select signal applied by one conductor is insufficient to cause the gate conductor 20 to be driven resistive. The device may be also operated in a selection system where ⅓ select signals are applied to each of the control conductors 22X, 22Y, and 22Z, with all three signals being required to introduce resistance into the loop. Such operation requires a steeper slope of the cryotron characteristic in the *k* to *c* vicinity as well as better control of the pulse amplitudes.

Figure 5:
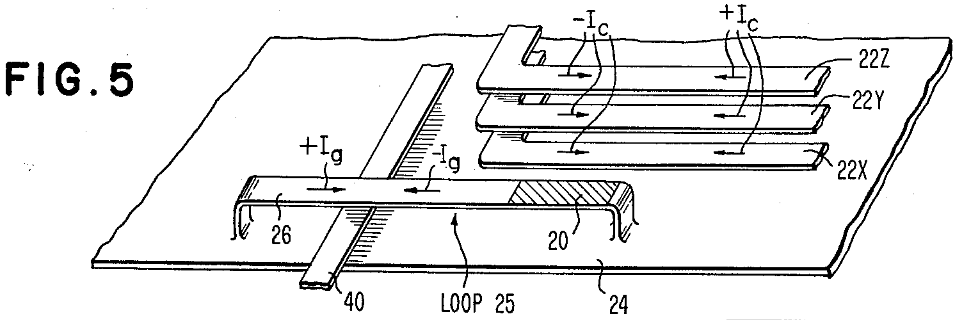
FIGS. 5 and 6 show other embodiments of superconductive storage devices constructed in accordance with the principles of the subject invention.

The structure and mode of operation of the embodiment of FIG. 5 is similar in many respects to that of FIG. 3 and for this reason, like reference characters have been used in both figures to identify like components. In the embodiment of FIG. 5 the persistent current storage loop 25 is formed by the path 26 and a return path in the shield 24. The operation of the device of FIG. 5 is also represented by the characteristic curve shown in FIG. 4. By using the shield as a return path for the loop, fabrication is made easier. As in the case of the other embodiments, a large number of the storage devices may be laid down on the same shield.

Persistent currents are established in the loop of FIG. 5 to store a binary one or a binary zero in the same manner as the loop of FIG. 3. The principal operational difference between the two loops is that the embodiment of FIG. 5 non-destructive read out is achieved by using a superconductor gate conductor 40 which is mounted between the upper path 26 of the loop and the lower loop path in shield 24.

After a binary one or a binary zero has been written in the device of FIG. 5 in the same manner as writing is accomplished in the device of FIG. 3, a readout operation is accomplished by coincidently energizing the conductors 22X and 22Y with quarter select signals in the positive current direction. When these signals are applied with the device storing a binary one at point *i*, the device undergoes an excursion from point *i* to point *s* during which the entire loop 25 remains superconducting. However, as a result of the applied fields, the current flow in the loop is increased. Since the loop remains entirely superconductive, the net flux throughout the entire loop remains unchanged. However, though the net flux remains unchanged throughout the entire loop, the application of the quarter select signals to control conductors 22X and 22Y produces flux changes in opposite directions in different portions of the loop. Thus in the portion of the loop immediately beneath the control conductors and gate conductor 20, the flux is actually decreased due to the mutual coupling between the control conductors and the loop over this section of the loop. More specifically, the current increase produced in the loop by the application of the signals to the control conductors in this portion of the loop produces a smaller change in field within the loop than the field produced by the signals applied to the control conductors themselves. However, in the left hand portion of the loop through which the gate conductor 40 is passed, there is no direct coupling from the control conductors 22X and 22Y. As a result, the increase in the loop current produces an increase in the local loop field. This increase in the field is applied to the gate conductor 40. The design is such that this gate conductor, which is constructed of indium and requires a smaller magnetic field to drive it resistive than the tin gate conductor 20, is driven resistive when the loop current is increased by the excursion from point *i* to point *s*.

The magnitude of current in the loop required to produce a sufficient magnetic field to drive the indium gate resistive is represented by the parallel horizontal lines designated $+I_{ci}$ and $-I_{ci}$ in the FIG. 4. From the position of these lines, it can be seen that when the device is storing either a binary one at point *i* or a binary zero at point *d*, the current in the loop is insufficient to produce a sufficient magnetic field to drive the indium gate resistive. When, however, quarter select signals are coincidently applied to conductors 22X and 22Y to produce an excursion from the binary one point *i* to point *s* the critical field for the indium gate is exceeded and the gate is driven resistive. When the quarter select read signals are applied with the device in the binary zero state at point *d*, the current in the loop is decreased and the indium gate remains superconducting. After a read operation, the device returns to its initial state at either the point *i*, representing a binary one, or point *d*, representing a binary zero. When only one of the conductors 22X or 22Y is energized with a quarter select signal, the loop current remains below that required to produce a sufficient field to drive the indium gate 40 resistive.

When the current in the loop is increased to the point *s*, as described above, to drive the indium gate 40 resistive during a readout operation, the current in the tin gate 20 in the loop is also increased to a value which can be equal to the basic critical self-current $I_{gc}$ for the gate. The tin gate remains superconductive since, at this time, there is a current flowing in the opposite direction in the control conductors which form, with this gate, an in-line cryotron.

Figures 6, 7:
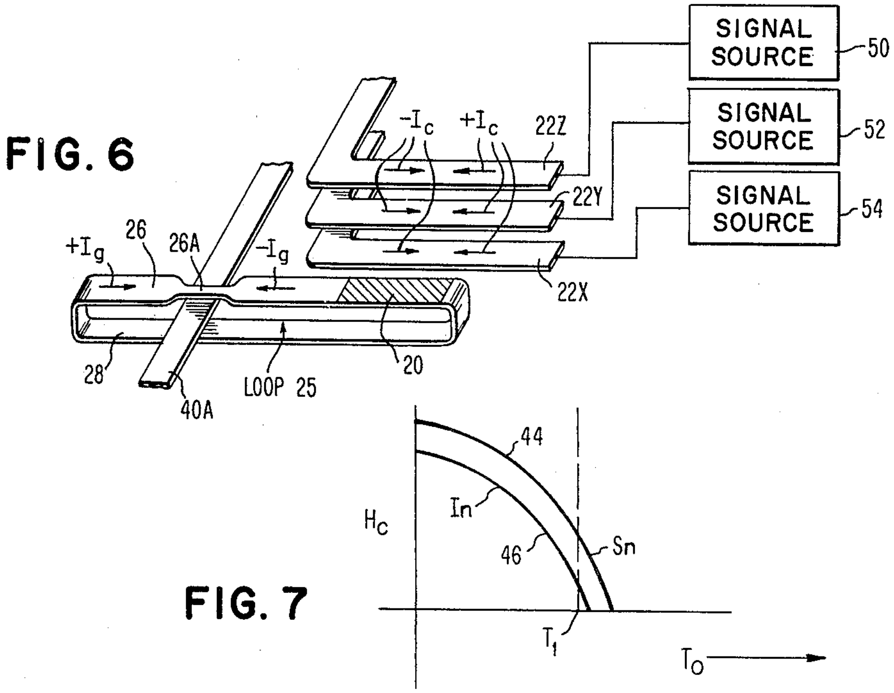
FIG. 7 is a plot of the superconductive magnetic field transition characteristics of tin and indium as a function of temperature.

FIG. 7 depicts the superconductive to normal magnetic field transition characteristics for indium and tin, the characteristic for indium being represented by the curve 46 and for tin by the curve 44. In this figure the critical external magnetic field necessary to drive the material resistive is plotted against the operating temperature $T_0$. The points at which the curves 44 and 46 intersect the abscissa represent the critical temperatures at which tin and indium become superconducting in the absence of a magnetic field. The device of FIG. 5 is operated at a temperature below the critical temperature for indium, for example, at the temperature indicated at $T_1$. At this temperature, the critical field required to drive indium resistive is less than that required to drive tin resistive and this relationship is employed to advantage in the non-destructive readout operation of the device of FIG. 5.

Quarter select signals in the negative direction may be applied to the conductor 22Z to mask the reading operations of the device of FIG. 5 in a manner similar to the masking operation described above with reference to the embodiment of FIG. 3. If positive, quarter signals are applied to the conductors 22X and 22Y and a negative quarter select signal to the conductor 22Z, the current in the loop remains below the value required to drive the indium gate 40 resistive regardless of whether a one or zero is stored. It should be noted that the indium gate 40 is arranged at right angles to the conductors forming the loop and there is no inductive coupling between the loop and this gate. Further, as is indicated by the parallel lines $+I_{ci}$ and $-I_{ci}$ in FIG. 4, the response of this gate is the same regardless of the direction of the current flow in the loop.

The embodiment of FIG. 6 is similar in construction and mode of operation to that of FIG. 5 and again like characters are used to identify like components. In FIG. 6, the shield 24 is not shown though it is preferable that a shield be provided. Further, three signal sources, designated 50, 52 and 54 are shown connected to the control conductors 22X, 22Y and 22Z. These signal sources, represented in block form, selectively apply the positive and negative half select and quarter select signals required to control writing and non-destructive reading of the device of FIG. 6. The embodiment of FIG. 6 differs from that of FIG. 5 in that a separate return path 28 is provided for the loop, and further, the upper path of loop 26 includes a narrow portion designated 26A immediately above the output gate conductor here designated 40A. This output gate conductor is here constructed of tin, that is of the same superconducting material as gate section 20. However, since the portion of path 26 which is immediately above the gate conductor 40A is narrower, the field intensity at this point, for a given current in the loop, is more intense adjacent section 26A than adjacent the tin gate conductor 20. Thus it is possible, without exceeding the critical current of gate 20 to produce a current in the loop that is sufficient to enable the control conductor section 26A to drive the tin gate conductor 40A resistive.

Operationally, the device of FIG. 6 is similar to that of FIG. 5 as explained above with reference to the diagram of FIG. 4. In this case, however, the parallel lines $+I_{ci}$ and $-I_{ci}$ represent the value of current in the narrow control conductor section 26A which is necessary to apply a sufficient field to the gate 40A to drive it resistive. It should be noted that in FIG. 6 the lower portion of the loop in path 28 immediately beneath section 26A is not narrow. However, as is indicated in subsequent figures it is also possible to fabricate the device with the esction of path 28 immediately beneath section 26A having the same configuration as section 26A.

Figures 8, 10:
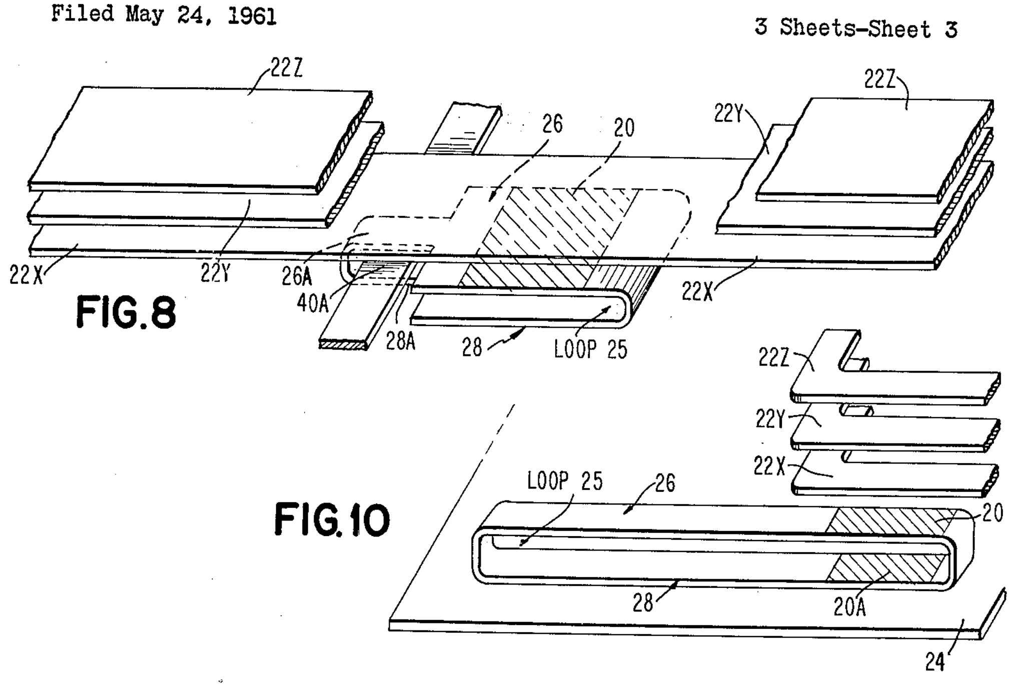
FIG. 8 shows the structure of another embodiment of a superconductive storage device constructed in accordance with the principles of the present invention.
FIGS. 10 and 11 show the structures of two other superconductive storage devices constructed in accordance with the principles of the present invention.

FIG. 8 shows still another embodiment of the invention including a persistent current loop 25 in which reading and writing operations are performed by the application of signals to three control conductors 22X, 22Y and 22Z. Operationally, the embodiment of FIG. 8 is the same as that of FIGS. 5 and 6 in that a binary one or a binary zero is written by coincidently applying half select pulses of proper polarity to control conductors 22X and 22Y. The writing operation may be inhibited by the application of a half select pulse of the proper polarity to the control conductor 22Z. Non-destructive reading operations are performed by applying quarter select signals of proper polarity to control conductors 22X and 22Y and such reading operations may be masked by the coincident operation of a quarter select signal of proper polarity to the control conductor 22Z. The output during a readout operation is provided by gate 40A which, in this embodiment, is also constructed of tin as is the gate 20 in the upper path 26 of loop 25. Only that portion of gate conductor 40A, which is adjacent the narrow sections 26A and 28A of the paths forming loop 25, is fabricated of tin and the remaining portions of this conductor as well as the other portions of the circuit are fabricated of a hard superconductor such as lead. In FIG. 8 the shield is not shown in order to provide a clearer showing of the details of the structure. It is preferable that the device be laid down on a superconducting shield. The embodiment of FIG. 8 differs from that of FIG. 6 in that both the upper and lower sections 26A and 28A of the two paths forming the loop are narrower in the vicinity of the output forming the conductors. Further the control conductors 22X, 22Y and 22Z pass over the entire loop 25, it not being necessary to arrange these gate conductors so that they are parallel to only a portion of the loop. This type of construction requires less space on the substrate and shield.

Though the three control conductors pass over the entire loop, the coupling between the control conductors and the loop is less than unity since the coupling between the control conductors and the narrower portion of the loop is much less than that between the control conductors and the wider portions of the loop. Thus, for example, the current induced in the loop by current flow in the control conductors is greater due to the coupling between the control conductors and the wide portion of the loop than due to the coupling between the control conductors and the narrow portion of the loop. By proper choice of geometry in the manner indicated in the figure, it is possible to arrange the three control conductors to pass over the entire loop and still provide operating lines, such as the line *hnik* in FIG. 4, having a slope less than unity, so that the persistent current stored in the loop is significantly less than the basic critical self-current $I_{gc}$ for the gate conductor.

Figures 9, 9A, 11:
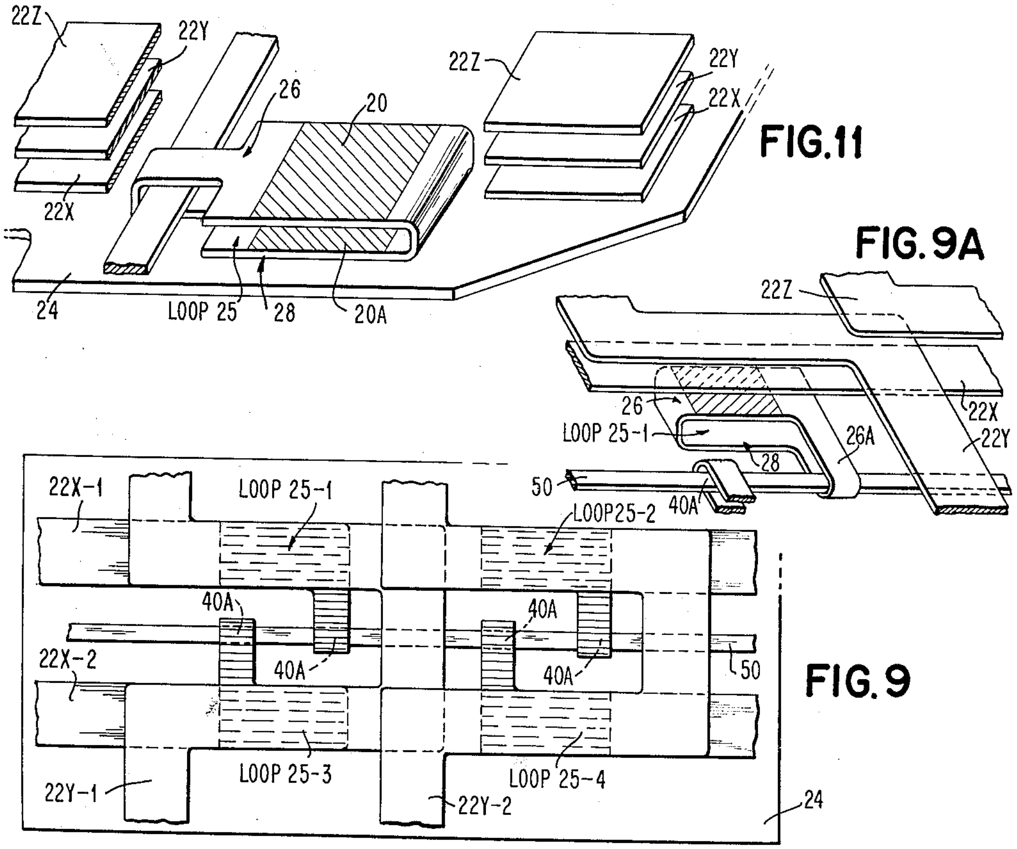
FIG. 9 shows a portion of a memory array of superconductive storage devices constructed in accordance with the principles of the present invention.
FIG. 9A is a more detailed sketch showing one of the storage devices in the memory array of FIG. 9.

FIG. 9 is a further embodiment illustrating the manner in which a number of storage devices constructed in accordance with the principles of the subject invention are arranged in a two dimensional memory array. The specific structure of the memory device used in the array of FIG. 9 is different than those previously described but the operation is the same. The detailed structure of this memory device, as arranged in the array, is shown in FIG. 9A. The loop 25–1, there shown, is formed of two paths 26 and 28 with the upper path including a gate section 20 which is controlled by two control conductors 22X and 22Y. These control conductors are not coupled into the entire loop since the loop itself is arranged to include a portion extending at right angles made up of narrow sections 26A and 28A. Though as indicated in the descriptions of the embodiment of FIG. 8 the loop with the narrow section control conductor arranged in this manner may be arranged parallel to the control conductors, the construction shown in FIG. 9A provides a device which has somewhat less critical operating parameters. The output for the device is provided, as before, by a tin gate conductor 40A which is arranged between the narrow sections 26A and 28A of the loop. As is indicated in the drawing, the gate conductor 40A for the loop 25–1 shown in detail forms part of a conductor 50 which also includes the gate conductor 40A of another storage loop. The operation of this loop is the same as that described above. Writing is achieved by the coincident application of half select signals to the conductors 22X and 22Y and non-destructive interrogation by coincident application of quarter select signals to these same conductors. A binary one output is achieved by the introduction of resistance into the tin gate 40A during a readout operation, the absence of resistance in this gate during a readout operation indicating a binary zero.

In the memory array of FIG. 9, four such loops are shown and shading is employed to provide a more distinct representation of the position of the memory loops in the array. The loops are designated 25–1, 25–2, 25–3 and 25–4. Two horizontal control lines designated 22X–1 and 22X–2 and two vertical control lines 22Y–1 and 22Y–2 are provided. Any one of the loops shown can be addressed by the coincident application of signals to a particular X drive line and Y drive line. Thus, for example, loop 25–1 is addressed by simultaneously applying signals to drive line 22X–1 and drive line 22Y–1. During writing operations these signals are half select signals and during read operations these signals are quarter select signals. The output during the read operation on any one of the cells is provided by a conductor 50 in which the output gate conductor 40A for each cell is connected in a series. When, during a read operation, resistance is introduced into line 50, this resistance can be sensed by the application of a small current to this line to produce a voltage across the line.

In each of the embodiments discussed above, the loop 25 is operated by selectively introducing resistance under the control of conductors 22X, 22Y and 22Z into a gate conductor section 20 located in the upper path 26. As is illustrated in the embodiments of FIGS. 10 and 11, the superconductive loop may be also constructed with the gate conductor sections arranged in the lower path or with two gate conductor sections arranged one above the other in the two paths 26 and 28 which form the superconductive loop 25. FIG. 10 shows a loop similar to that used in the embodiments of FIGS. 3 and 6. As is shown in FIG. 10, a gate conductor section of a soft superconductive material 20A is located in the lower path 28 of the loop immediately beneath the gate conductor section 20 in the upper path 26. This loop is arranged above the superconductive shield 24 in the same manner as is in the other embodiments and the control conductors 22X, 22Y and 22Z also are similarly arranged. Though the current direction in the gate conductor section 20A is opposite to that of the current direction in the upper gate 20 and therefore it might be assumed that the gate conductor 20A responds differently to the control signals applied to conductors 22X, 22Y and 22Z, this is not the case, since the shield 24 provides a path in which a current imaging the net current in the multiple control conductors is produced. This net current flowing in the shield is in an opposite direction to the current in the control conductors, so that the image current in the shield has the same directional relationship to the current in gate 20A as the current in conductors 22X, 22Y and 22Z has to the current in gate 20. Therefore, these two gate conductor sections 20 and 20A respond in the same manner to the control signals. The advantage of this construction is that the resistance introduced into the loop under the control of the control conductors is doubled without significantly increasing the inductance of the loop itself or requiring the addition of any more structure. Therefore, the time constant of the loop is considerably reduced.

This type of construction with the gate conductors arranged in both the paths 26 and 28 may be used in operating a circuit in accordance with the principles discussed above with reference to the embodiments of FIG. 3 or 6, that is using a non-destructive readout or a destructive readout operation with or without a superconductive output gate. Further, this structure also illustrates that the entire loop 25 may be fabricated of a soft superconductive material such as tin as long as the output for the device is not taken from a tin gate conductor.

FIG. 11 shows a loop structure which is geometrically the same as that shown in the embodiments of FIG. 8 with gate conductor sections 20 and 20A arranged in both paths 26 and 28. The device is located above a superconductor shield 24 and is driven by the control conductors 22X, 22Y and 22Z as discussed above with reference to the embodiments of FIG. 8. The only difference in the mode of operation is that both of the gate conductors 20 and 20A are driven resistive at the same time when the persistent current state of the loop is to be changed and thus the speed of the operation is increased appreciably. With the type of construction shown in FIGS. 8, 9 and 11 using a tin output gate, it is necessary that at least the narrow portions of the loop 25 be fabricated of a hard superconductive material, such as lead.

Though the embodiments of FIGS. 10 and 11 provide an important advantage in increased speed, it should be noted that the fabrication problems are somewhat more severe than those encountered in constructing the other embodiments since the gate of the two gates 20 and 20A should be reproduced within close tolerances so that both gates go resistive at essentially the same time.

Though in the embodiments of the invention disclosed herein by way of illustrating the principles of the invention, the low inductance, high speed storage loop has been shown operated in conjunction with in-line type drivers, the improved characteristics of this storage loop may be utilized in superconductive circuits operated in different modes to achieve either switching or storage functions in which for example currents may be directly applied to the loop and switched between the two paths forming the loop. Further, though the embodiments herein are shown employing superconductive shields and the control conductors are monofilar, bifilar construction of the type shown and described in the above cited copending application Serial No. 824,120, with and without shields may be employed.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A superconductive storage device maintained at a superconducting temperature comprising first, second, third and fourth planar superconductive conductors laid down one above the other and extending in parallel spaced relationship to each other over at least a portion of their length, each of said conductors having a width appreciably greater than its thickness, said first and second conductors being connected together to form a closed loop of superconductive material having an axis parallel to the width dimension of said conductors, means for selectively energizing said third and fourth conductors to establish a persistent current in said loop and to interrogate the persistent current state of said loop, and a superconducive gate conductor positioned through said loop formed by said first and second conductors and responsive to the flux threading a portion of said loop, said gate conductor being superconducting when such persistent current is stored in said loop, said third and fourth conductors being effective when energized to interrogate said loop to increase the current in said loop and thereby the flux in the portion of said loop through which said gate is positioned so as to cause said gate to be driven from a superconducting to a normal state, said loop remaining entirely superconductive when said third and fourth conductors are energized, resulting in a non-destructive interrogation of said loop.

2. A superconductive storage device comprising a closed loop of superconductive material, said loop being formed of first and second planar films of superconductive material each having a width appreciably greater than its thickness and arranged one above the other, control conductor means forming with at least a gate portion of one of said films an in-line cryotron for controlling the storage of persistent current in said loop and the interrogation of persistent current in said loop, said persistent current flowing in said loop around an axis which is parallel to the width dimension of said first and second conductors, said first film being a superconductive shield and said second film being a superconductive conductor of appreciably smaller planar dimensions than said superconductive shield, and said second film conductor being laid down on said shield and connected at two points to said shield to form said superconductive loop.

3. The device of claim 2 wherein a superconductive gate conductor is positioned through said loop between said first and second superconductive films.

References Cited by the Examiner

UNITED STATES PATENTS

| | | | |
|---|---|---|---|
| 3,059,196 | 10/62 | Lentz | 340—173.1 |
| 3,082,408 | 3/63 | Garwin | 340—173.1 |

| | | | |
|---|---|---|---|
| 3,094,685 | 6/63 | Crowe | 340—173.1 |
| 3,119,076 | 1/64 | Schlig et al. | 340—173.1 |

FOREIGN PATENTS

| | | |
|---|---|---|
| 873,624 | 7/61 | Great Britain. |

OTHER REFERENCES

"Trapped-Flux Superconducting Memory," by J. W. Crowe, in IBM Journal, October 1957, pp. 295–302.

IRVING L. SRAGOW, *Primary Examiner*.